UNITED STATES PATENT OFFICE.

CYRUS E. PEIRCE, OF McPHERSON, KANSAS.

IMPROVEMENT IN COMPOUNDS FOR ARTIFICIAL STONE.

Specification forming part of Letters Patent No. 213,685, dated March 25, 1879; application filed March 22, 1878.

*To all whom it may concern:*

Be it known that I, CYRUS E. PEIRCE, of McPherson, in the county of McPherson and State of Kansas, have invented a new and useful Compound for the Manufacture of Artificial Stone, which compound is fully described in the following specification.

The nature of my invention relates to a new and useful composition of sand, cement, and lime, cemented with certain chemicals, for the production of artificial stone by the process hereinafter set forth.

In the preparation of five gallons of my compound I take of nitrate of potassa, twelve ounces; sirup, one-half pint; glue, one-fourth pound; alum, one pound; soluble glass, one pound. These I mix together, and bring to a boil over a gentle fire, and, when cold, I add four ounces of sulphuric acid.

With the above compound I slake my lime, and add said slaked lime and cement, in proportion of one to five of sand, according to fineness. The whole is then ground together and dampened to the consistency of molders' sand.

The compound thus prepared can readily be pressed or molded into any desired form.

What I claim as my invention is—

1. A compound for the production of artificial stone, composed of the ingredients and substantially in the proportions herein set forth.

2. As a new article of manufacture, an artificial stone made from the ingredients and substantially in the manner herein set forth.

CYRUS E. PEIRCE.

Witnesses:
H. S. SPRAGUE,
CHAS. J. HUNT.